(12) United States Patent
Inoue

(10) Patent No.: US 9,876,917 B2
(45) Date of Patent: Jan. 23, 2018

(54) IMAGE READING APPARATUS, METHOD FOR CONTROLLING IMAGE READING APPARATUS, AND STORAGE MEDIUM

(71) Applicant: CANON KABUSHIKI KAISHA, Tokyo (JP)

(72) Inventor: Katsuhiro Inoue, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/957,489

(22) Filed: Dec. 2, 2015

(65) Prior Publication Data

US 2016/0165071 A1 Jun. 9, 2016

(30) Foreign Application Priority Data

Dec. 8, 2014 (JP) ................................. 2014-248258

(51) Int. Cl.
*H04N 1/04* (2006.01)
*H04N 1/00* (2006.01)
*H04N 1/387* (2006.01)

(52) U.S. Cl.
CPC ......... *H04N 1/0023* (2013.01); *H04N 1/3877* (2013.01); *H04N 2201/0039* (2013.01); *H04N 2201/0081* (2013.01)

(58) Field of Classification Search
CPC ............. H04N 2201/0081; H04N 1/04; H04N 1/1013; H04N 2201/0414; H04N 1/0044; H04N 1/1017; G06T 2207/10008; G06T 3/0031; G06T 5/003; G06T 5/006; G06T 5/20; G06T 7/0083; G06T 11/60; G06T 2207/20036

USPC ...... 358/474, 498, 1.13, 1.15, 1.5, 448, 488, 358/497, 401, 499, 451, 473, 475, 494, 358/1.6, 2.1, 2.99, 3.01, 3.26, 3.32, 450, 358/452, 453, 463, 464, 483; 382/177, 382/182, 173, 176, 229, 275, 195, 280, 382/321, 167, 178, 181, 199, 201, 209, 382/224, 274, 289, 311

See application file for complete search history.

(56) References Cited

U.S. PATENT DOCUMENTS

| 6,219,454 | B1 * | 4/2001 | Kawano | G06T 9/001 |
| | | | | 382/166 |
| 7,424,237 | B2 * | 9/2008 | Ushio | G03G 15/36 |
| | | | | 399/408 |
| 7,551,885 | B2 * | 6/2009 | Yaguchi | G03G 15/607 |
| | | | | 358/1.17 |
| 8,045,240 | B2 * | 10/2011 | Cook | H04N 1/10 |
| | | | | 358/408 |
| 8,194,292 | B2 * | 6/2012 | Cook | H04N 1/00816 |
| | | | | 358/408 |
| 8,237,976 | B2 * | 8/2012 | Takahashi | H04N 1/00411 |
| | | | | 358/1.16 |

(Continued)

FOREIGN PATENT DOCUMENTS

JP 2000-137410 A 5/2000

*Primary Examiner* — Negussie Worku
(74) *Attorney, Agent, or Firm* — Canon USA, Inc. I.P. Division

(57) ABSTRACT

An image reading apparatus includes a setting unit configured to set a document opening orientation, and a reading unit configured to read a document according to the document opening orientation set by the setting unit in a case where a reading instruction is received based on a predetermined communication protocol.

12 Claims, 4 Drawing Sheets

(56) References Cited

U.S. PATENT DOCUMENTS

| | | | | |
|---|---|---|---|---|
| 8,261,291 B2* | 9/2012 | Yokoyama | H04N 1/00217 | 715/209 |
| 8,462,378 B2* | 6/2013 | Takeda | G03G 15/36 | 345/629 |
| 8,638,363 B2* | 1/2014 | King | G06F 17/211 | 340/937 |
| 8,707,207 B2* | 4/2014 | Harada | G06F 3/1205 | 358/1.15 |
| 9,197,785 B2* | 11/2015 | Tamura | H04N 1/3875 | |
| 9,241,083 B2* | 1/2016 | Ogawa | H04N 1/00973 | |
| 9,288,346 B2* | 3/2016 | Sato | H04N 1/00411 | |
| 2004/0075642 A1* | 4/2004 | Kisliakov | G06F 1/1626 | 345/156 |
| 2006/0103588 A1* | 5/2006 | Chrisop | G06F 21/41 | 345/2.1 |
| 2007/0050460 A1* | 3/2007 | Kasatani | H04N 1/00127 | 709/206 |
| 2007/0291304 A1* | 12/2007 | Takahashi | G06F 3/1204 | 358/1.15 |
| 2008/0225346 A1* | 9/2008 | Mano | H04N 1/40 | 358/448 |
| 2009/0204411 A1* | 8/2009 | Morikawa | G10L 17/26 | 704/275 |
| 2010/0110500 A1* | 5/2010 | Inoue | G06F 3/1205 | 358/468 |
| 2010/0259799 A1* | 10/2010 | Shibao | H04N 1/00217 | 358/448 |
| 2010/0309526 A1* | 12/2010 | Kulkarni | H04N 1/506 | 358/3.26 |
| 2011/0069356 A1* | 3/2011 | Yoshida | H04N 1/00217 | 358/442 |
| 2012/0044533 A1* | 2/2012 | Inoue | H04N 1/0022 | 358/1.15 |
| 2013/0033726 A1* | 2/2013 | Sakura | G06F 3/1204 | 358/1.15 |
| 2013/0051541 A1* | 2/2013 | Inoue | H04M 11/066 | 379/100.01 |
| 2013/0208300 A1* | 8/2013 | Sakura | G06K 15/4045 | 358/1.14 |
| 2014/0071494 A1* | 3/2014 | Inoue | H04N 1/32101 | 358/1.16 |
| 2014/0118769 A1* | 5/2014 | Adachi | G06F 3/1211 | 358/1.13 |
| 2014/0285826 A1* | 9/2014 | Sato | G06F 3/1292 | 358/1.6 |
| 2014/0293365 A1* | 10/2014 | Inoue | H04N 1/0022 | 358/442 |
| 2014/0325517 A1* | 10/2014 | Takahashi | G06F 9/5077 | 718/102 |
| 2014/0340718 A1* | 11/2014 | Inoue | H04N 1/00217 | 358/440 |
| 2016/0150120 A1* | 5/2016 | Inoue | H04N 1/32096 | 358/440 |

* cited by examiner

FIG. 4

TWO-SIDED DOCUMENT OPENING ORIENTATION
SETTING FOR PULL SCAN BASED ON PROTOCOL 1

BOOK STYLE ORIENTATION    CALENDAR STYLE ORIENTATION

IMAGE READING APPARATUS, METHOD FOR CONTROLLING IMAGE READING APPARATUS, AND STORAGE MEDIUM

BACKGROUND OF THE INVENTION

Field of the Invention

The present invention relates to an image reading apparatus, a method for controlling an image reading apparatus, and a storage medium.

Description of the Related Art

Some conventional image reading apparatuses configured to be connected onto a network include a scanner function that reads a document, generates data, and transmits the data to an information terminal apparatus such as a personal computer (PC).

The scanner function may include a "pull scan" function in which a scanner function of an image reading apparatus serving as a server is activated by an operation performed on an information terminal apparatus serving as a client, and scanned data is transmitted from the image reading apparatus to the information terminal apparatus.

In general, the orientation of an output image, read by an image reading apparatus, depends on a reading direction determined by a physical mechanism of the image reading apparatus. Accordingly, to acquire read images orientating in a vertically correct direction (same direction), all settings such as the orientation of a placed document, and page opening orientation need to be taken into consideration when image rotation is performed.

As discussed in Japanese Patent Application Laid-Open No. 2000-137410, in a case where a scan of a two-sided document is started through an operation unit of an image reading apparatus, a preset document opening orientation (book style orientation (i.e., pages are horizontally opened), calendar style orientation (i.e., pages are vertically opened)) is considered. In the case of the calendar style orientation, an image on the back side of the two-sided document is rotated by 180 degrees, so that the user can acquire images orientating in a vertically correct direction on the information terminal apparatus.

However, some communication protocols do not allow a user to set a document opening orientation for two-sided reading on an information terminal apparatus serving as a client when a pull scan is performed. In such a case, a scan request command issued by the information terminal apparatus cannot reflect the document opening orientation setting for the two-sided reading, and the document opening orientation is always based on a default setting of an image reading apparatus. Therefore, when a user performs a pull scan of a two-sided document in the calendar style orientation, an image on a back side of the two-sided document is upside down in image data transmitted to the information terminal apparatus.

SUMMARY OF THE INVENTION

According to an aspect of the present invention, an image reading apparatus includes a setting unit configured to set a document opening orientation, and a reading unit configured to read a document according to the document opening orientation set by the setting unit in a case where a reading instruction is received through a predetermined communication protocol.

Further features of the present invention will become apparent from the following description of exemplary embodiments with reference to the attached drawings.

BRIEF DESCRIPTION OF THE DRAWINGS

FIG. 4 illustrates an example of a screen for setting a document opening orientation.

DESCRIPTION OF THE EMBODIMENTS

An exemplary embodiment of the present invention will be described below with reference to the drawings.

Figure 1:
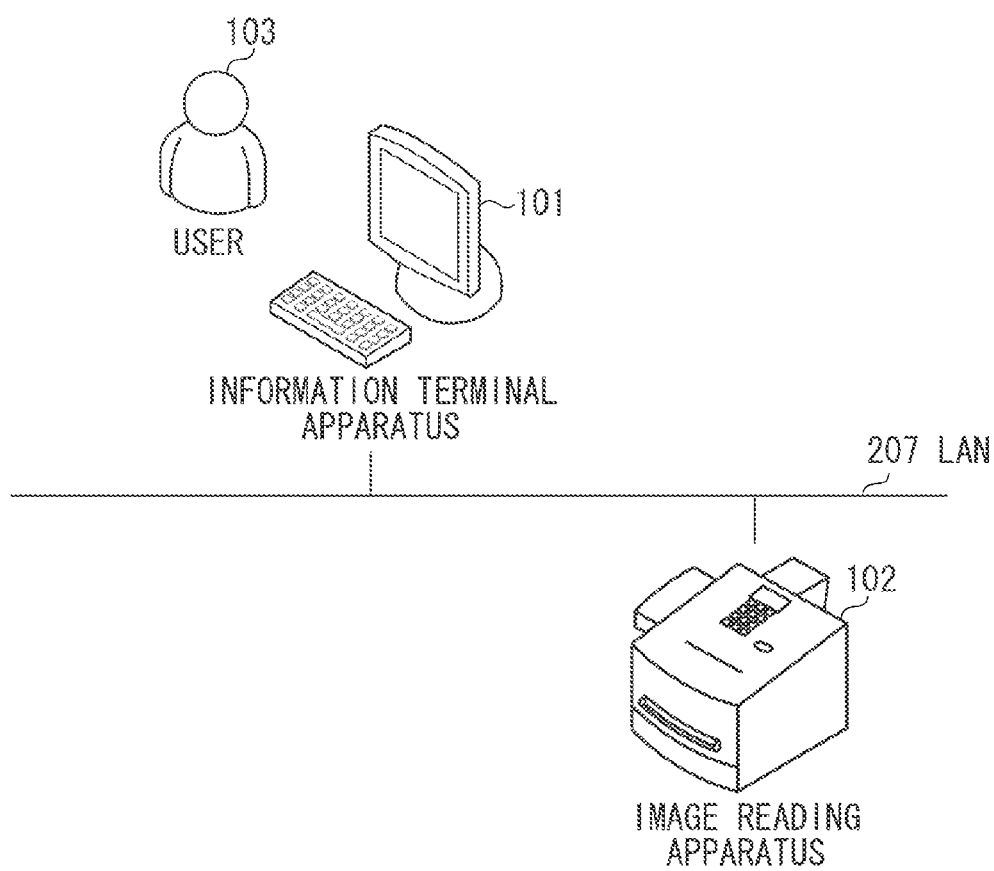
FIG. 1 illustrates an example of a system configuration of an image reading system.

FIG. 1 illustrates an example of a system configuration of an image reading system. An information terminal apparatus 101 instructs an image reading apparatus 102 connected onto a network to perform a pull scan. The information terminal apparatus 101 is an example of an external apparatus. The image reading apparatus 102 receives scan parameter information (image format type, reading resolution, two-sided setting, etc.) from the information terminal apparatus 101. Then, the image reading apparatus 102 reads a document based on the scan parameter information and transmits the read image data to the information terminal apparatus 101 having given the pull scan instruction. The image reading apparatus 102 may be a single-function apparatus having only the scanner function usable over the network. Further, the image reading apparatus 102 may be a multi-function apparatus having multiple functions (scan, print, facsimile, etc.), such as a multiple function peripheral (MFP). A user 103 is a user operating the information terminal apparatus 101.

A flow of pull scan processing will be roughly described below. First, the information terminal apparatus 101 searches for an image reading apparatus in response to a search instruction from the user 103, and registers the found image reading apparatus 102. At the time of the registration, the information terminal apparatus 101 acquires capability information about a scanner from the image reading apparatus 102. Next, the user 103 places a document to be scanned on a platen glass of the image reading apparatus 102 and performs scan settings (image format type, reading resolution, two-sided setting, etc.) on the information terminal apparatus 101. The information terminal apparatus 101 transmits, to the image reading apparatus 102, a scan start request including the set scan parameter information in response to a scan start instruction from the user 103. The image reading apparatus 102 reads the document based on the scan parameter information included in the scan start request received from the information terminal apparatus 101. Then, the image reading apparatus 102 converts the read image into the image format specified by the scan parameter information and transmits the converted image data to the information terminal apparatus 101.

Figure 2:
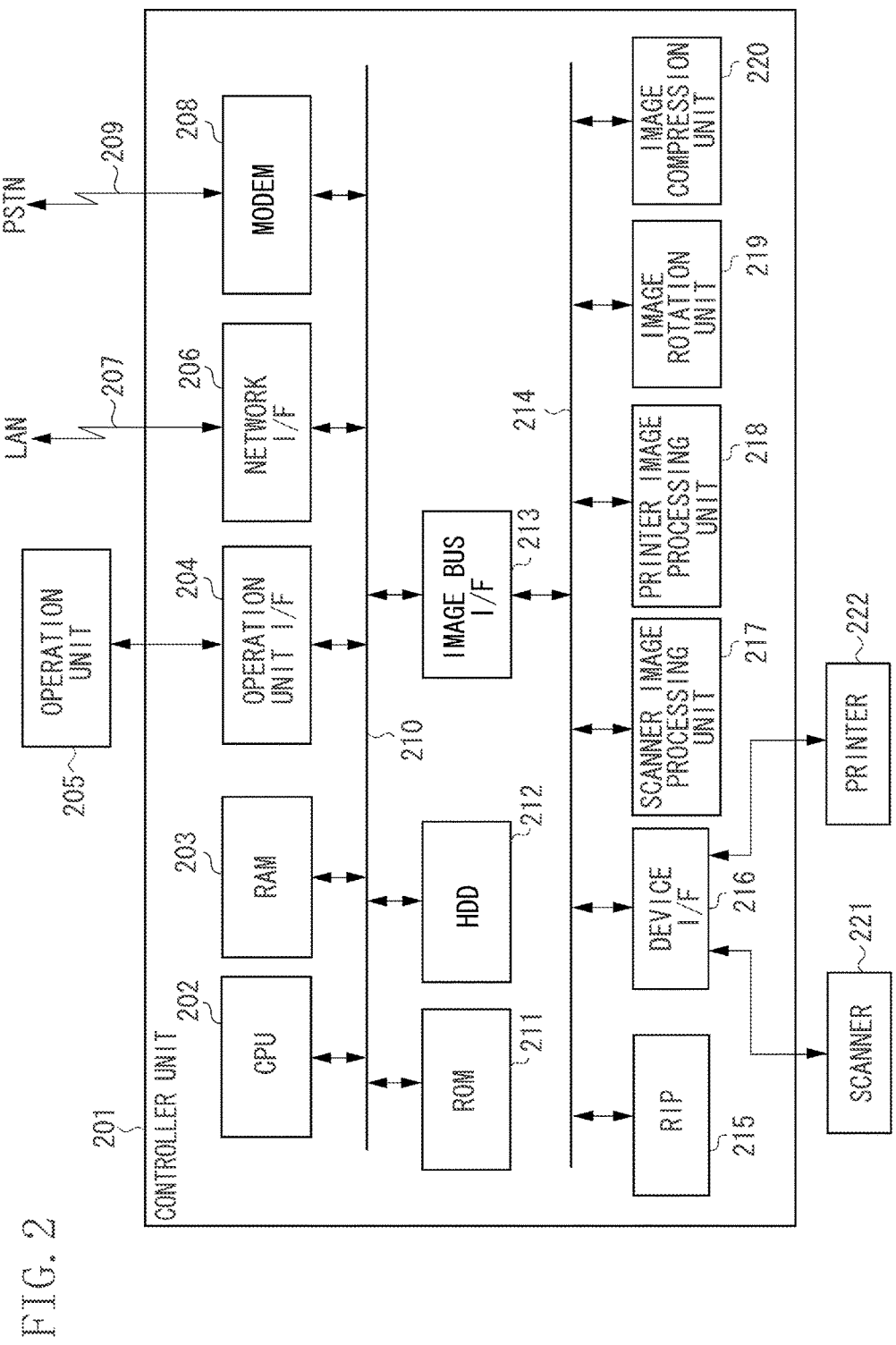
FIG. 2 illustrates an example of a hardware configuration of an image reading apparatus.

FIG. 2 illustrates an example of a hardware configuration of the image reading apparatus 102.

A controller unit 201 is connected to a scanner 221 serving as an image input device and a printer 222 serving as an image output device. Further, the controller unit 201 is a controller configured to connect to a local area network (LAN) 207 or a public switched telephone network (PSTN) 209 to input and output image information and device information. A central processing unit (CPU) 202 is a controller configured to control the entire system. A random-access memory (RAM) 203 is a system work memory for the CPU 202 to operate and is also an image memory for temporary storage of image data. A read-only memory (ROM) 211 is a boot ROM, and a system boot program is stored in the ROM 211. A hard disk drive (HDD) 212 is a hard disk drive storing a system software program and image data. An operation unit interface (I/F) 204 is an interface unit with an operation unit (user interface (UI)) 205 including a touch panel. The operation unit I/F 204 outputs image data to be displayed on the operation unit 205 to the operation unit 205. Further, the operation unit I/F 204 has a function to transmit information input by the user 103 via the operation unit 205 to the CPU 202. A network I/F 206 connects to the LAN 207 to input and output communication data. A modem 208 connects to the PSTN 209 to input and output communication data. The foregoing devices are connected to a system bus 210.

An image bus I/F 213 is a bus bridge configured to connect the system bus 210 with an image bus 214, which transfers image data at high speed, and to convert a data configuration. The image bus 214 includes, for example, a Peripheral Component Interconnect (PCI) bus or the Institute of Electrical and Electronics Engineers (IEEE) 1394. The following devices are connected to the image bus 214. A raster image processor (RIP) 215 rasterizes a page description language (PDL) code into a bitmap image. A device I/F 216 connects the scanner 221 and the printer 222, which are image input/output devices, to the controller unit 201 and performs synchronous and asynchronous conversion on image data. A scanner image processing unit 217 corrects, processes, and edits input image data. A printer image processing unit 218 performs printer correction and resolution conversion for print output image data. An image rotation unit 219 rotates image data. An image compression unit 220 performs image data compression/decompression processing using the Joint Photographic Experts Group (JPEG) method for multivalued image or methods such as the Joint Bi-level Image Experts Group (JBIG), Modified Modified Relative Element Address Designate (MMR), and Modified Huffman (MH) for binary image data.

The configuration illustrated in FIG. 2 is a configuration example of the image reading apparatus 102 as a multi-function peripheral (MFP), and the image reading apparatus 102 may be a single-function apparatus that having only the scanner function usable over the network. Further, the image reading apparatus 102 may be a multi-function apparatus, such as a MFP, capable of simultaneously providing multiple functions (scan, print, facsimile, etc.). More specifically, depending on the configuration of the image reading apparatus 102, a part of the configuration described above may not exist. The CPU 202 executes processing based on a program stored in the ROM 211 or the HDD 212 to realize the functions of the image reading apparatus 102 and processing specified in a flow chart described below.

Figure 3:
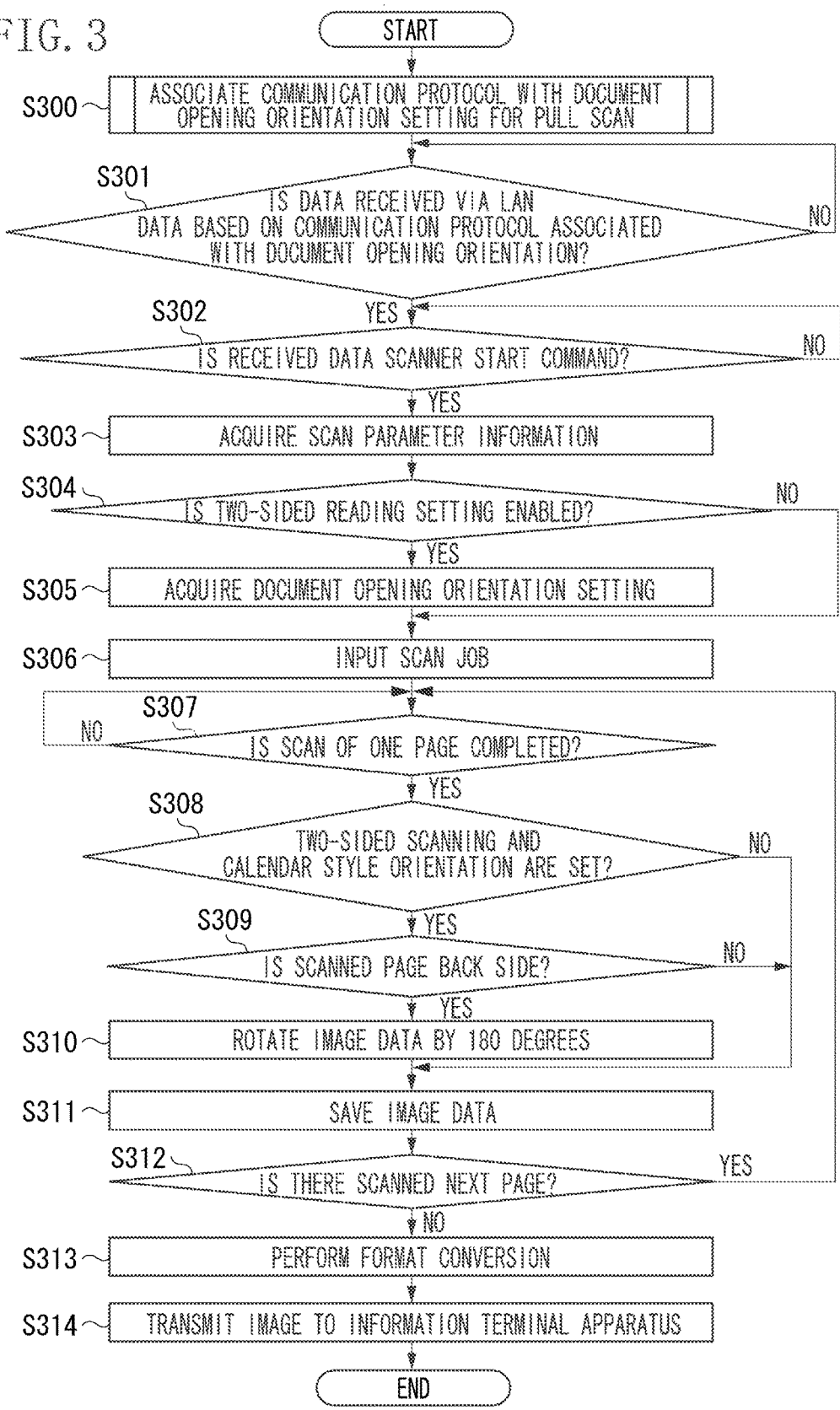
FIG. 3 illustrates an example of a flow chart of information processing to be performed by an image reading apparatus.

FIG. 3 is a flow chart illustrating an example of information processing to be performed by the image reading apparatus 102. In step S300, the CPU 202 associates a communication protocol with a document opening orientation setting for a pull scan according to a user operation via the operation unit 205 (FIG. 4). FIG. 4 illustrates an example of a screen for setting the document opening orientation, which is displayed on the operation unit 205. The CPU 202 saves the associated information (set value) to the HDD 212.

For example, the CPU 202 displays one preset communication protocol on the operation unit 205 and prompts the user to select a document opening orientation to be associated with the communication protocol. Further, the CPU 202 may display multiple preset communication protocols on the operation unit 205, display a communication protocol, selected by the user, on the operation unit 205, and then prompt the user to select a document opening orientation to be associated with the communication protocol. The following description is on the assumption that Internet Printing Protocol (IPP) as an example of the communication protocol is preset or selected by the user. The communication protocol is not limited to IPP, and may be Apple Air Print (APP) protocol, for example.

In step S301, the CPU 202 determines whether the data received from the LAN 207 is data based on the communication protocol associated with the document opening orientation in step S300. If the CPU 202 determines that the received data is data based on the communication protocol associated with the document opening orientation in step S300 (YES in step S301), the processing proceeds to step S302. On the other hand, if the CPU 202 determines that the received data is not data based on the communication protocol associated with the document opening orientation in step S300 (NO in step S301), step S301 is repeated to wait for reception of data based on the communication protocol.

In step S302, the CPU 202 determines whether the received data is a scanner start command. If the CPU 202 determines that the received data is a scanner start command (YES in step S302), the processing proceeds to step S303. On the other hand, if the CPU 202 determines that the received data is not a scanner start command (NO in step S302), step S302 is repeated to wait for reception of scanner start command data. In step S303, the CPU 202 acquires scan parameter information included in the scanner start command. Examples of scan parameter information include an image format type supported by the image reading apparatus 102, reading resolution, and information about selected options for color reading and two-sided reading.

In step S304, the CPU 202 determines whether a two-sided reading setting in the scan parameter information is enabled. If the CPU 202 determines that the two-sided reading setting is enabled (YES in step S304), the processing proceeds to step S305. On the other hand, if the CPU 202 determines that the two-sided reading setting is not enabled (NO in step S304), the processing proceeds to step S306. In step S305, the CPU 202 acquires the document opening orientation (book style orientation (i.e., pages are horizontally opened), calendar style orientation (i.e., pages are vertically opened)) setting from the set value associated with the communication protocol in step S300. In step S306, the CPU 202 sets the scan parameter information including the document opening orientation setting (book style orientation, calendar style orientation) for a two-sided document to an attribute of a scan job and inputs the scan job.

In step S307, the document is scanned and the CPU 202 determines whether a scan of one page has been completed. If the CPU 202 determines that a scan of one page is completed (YES in step S307), the processing proceeds to step S308. On the other hand, if the CPU 202 determines that a scan of one page is not completed (NO in step S307), step S307 is repeated. In step S308, the CPU 202 determines whether the two-sided scanning and the calendar style orientation settings are included in the scan job attribute. If the CPU 202 determines that the two-sided scanning and the calendar style orientation settings are included in the scan job attribute (YES in step S308), the processing proceeds to step S309. On the other hand, if the CPU 202 determines that the two-sided scanning and the calendar style orientation settings are not included (NO in step S308), the processing proceeds to step S311. In step S309, the CPU 202 determines whether the scanned page is the back side. If the CPU 202 determines that the scanned page is the back side (YES in step S309), the processing proceeds to step S310. On the other hand, if the CPU 202 determines that the scanned page is not the back side (NO in step S309), the processing proceeds to step S311. In step S310, the CPU 202 rotates the image data of the scanned page by 180 degrees. The image data of the scanned page is an example of a read image of a document.

In step S311, the CPU 202 saves the image data to the HDD 212. In step S312, the CPU 202 determines whether there is a scanned next page. If the CPU 202 determines that there is a scanned next page (YES in step S312), the processing returns to step S307. On the other hand, if the CPU 202 determines that there is no scanned next page (NO in step S312), the processing proceeds to step S313. In step S313, the CPU 202 performs format conversion according to the image format type specified in the scan parameter information and saves the converted image data to the HDD 212. In step S314, the CPU 202 transmits the format-converted image data to the information terminal apparatus 101.

Other Exemplary Embodiment

In the exemplary embodiment described above, if it is determined in step S301 that the received data is not data based on the communication protocol associated with the document opening orientation setting in step S300, the processing performed in step S301 is repeated to wait for reception of data based on the communication protocol. However, it is not limited thereto. Alternatively, if it is determined in step S301 that the received data is not data based on the communication protocol associated with the document opening orientation setting in step S300, the operation may be performed according to the document opening orientation set by the user via the information terminal apparatus 101. More specifically, in step S305, the CPU 202 may acquire the document opening orientation (book style orientation, calendar style orientation) setting transmitted from a scanner driver, and the processing performed in steps S302 to S314 may be executed. The present invention can be also realized as follows. Specifically, a program for realizing one or more functions specified in the exemplary embodiment described above is supplied to a system or apparatus via a network or storage medium, and then one or more processors in a computer of the system or apparatus read and execute the program. Further, the present invention can be also realized by a circuit (e.g., application specific integrated circuit (ASIC)) configured to realize one or more functions.

The processing according to the exemplary embodiments described above enables a document to be read according to a set document opening orientation in a case where a reading instruction is received via a set communication protocol. Therefore, a user can acquire images with the correct sides up.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-248258, filed Dec. 8, 2014, which is hereby incorporated by reference herein in its entirety.

What is claimed is:

1. An image reading apparatus which is able to communicate with an external apparatus with a plurality of communication protocols, comprising:
   a user interface configured to set a document opening orientation used when receiving a reading instruction with a predetermined communication protocol from an external apparatus;
   a memory; and
   a processor in communication with the memory, configured to:
   store, in a storage unit, the set document opening orientation set by the user interface in association with the predetermined communication protocol of the plurality of communication protocols
   receive a reading instruction;
   control a reading unit to read an image of a first side of a document and an image of a second side of the document based on the received reading instruction; and
   control the image of the second side of the document to be rotated according to the document opening orientation stored in association with the predetermined communication protocol in a case where the reading instruction is received with the predetermined communication protocol from the external apparatus.

2. The image reading apparatus according to claim 1, wherein the processor is further configured to transmit image data generated by reading the document to the external apparatus.

3. The image reading apparatus according to claim 1, wherein Internet Printing Protocol (IPP) is the predetermined communication protocol of the plurality of communication protocols.

4. The image reading apparatus according to claim 1, wherein the document opening orientation is one of book style or calendar style.

5. The image reading apparatus according to claim 1, wherein the document is read based on a pull scan operation.

6. A method for controlling an image reading apparatus which is able to communicate with an external apparatus with a plurality of communication protocols, the image reading apparatus which has a user interface configured to set a document opening orientation used when receiving a reading instruction with a predetermined communication protocol from an external apparatus, the method comprising:

storing, in a storage unit, the set document opening orientation set by the user interface in association with the predetermined communication protocol of the plurality of communication protocols with a document opening;

receiving a reading instruction;

controlling a reading unit to read an image of a first side of a document and an image of a second side of the document based on the received reading instruction; and rotating the image of the second side of the document according to the document opening orientation stored in association with the predetermined communication protocol in a case where the reading instruction is received with the predetermined communication protocol from the external apparatus.

7. A non-transitory computer-readable storage medium storing a program that causes a computer to execute a method for controlling an image processing apparatus which is able to communicate with an external apparatus with a plurality of communication protocols, the image reading apparatus which has a user interface configured to set a document opening orientation used when receiving a reading instruction with a predetermined communication protocol from an external apparatus, the method comprising:

storing, in a storage unit, the set document opening orientation set by the user interface in association with the predetermined communication protocol of the plurality of communication protocols;

receiving a reading instruction;

controlling a reading unit to read an image of a first side of a document and an image of a second side of the document based on the received reading instruction; and rotating the image of the second side of the document according to the document opening orientation stored in association with the predetermined communication protocol in a case where the reading instruction is received with the predetermined communication protocol from the external apparatus.

8. An image reading apparatus which is able to communicate with an external apparatus with a plurality of communication protocols, comprising:

a reading unit configured to read a document;

a user interface configured to set a reading setting and an association of the reading setting with at least one of the plurality of communication protocols;

a memory; and a processor in communication with the memory, configured to:

store, in a storage unit, the reading setting and the association of the reading setting with the associated communication protocol;

receive a reading instruction from the external apparatus;

determine whether the reading instruction is transmitted, from the external device, using the associated communication protocol; and control the reading unit to read an image of a document according to the reading setting, stored in the storage unit, in a case where it is determined that the reading instruction is transmitted from the external device using the associated communication protocol.

9. The image reading apparatus according to claim 8, wherein the processor is further configured to transmit image data generated by reading the document to the external apparatus.

10. The image reading apparatus according to claim 8, wherein the associated communication protocol is Internet Printing Protocol (IPP).

11. The image reading apparatus according to claim 8, wherein the reading setting is a document opening orientation.

12. The image reading apparatus according to claim 8, wherein the document is read based on a pull scan operation.

* * * * *